Patented Dec. 27, 1932

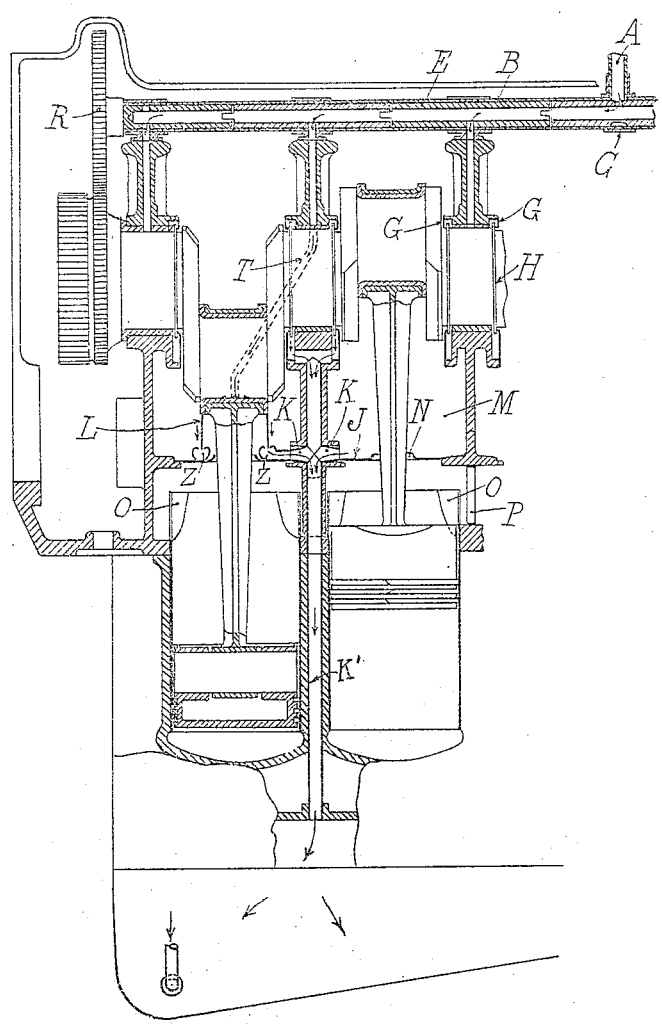

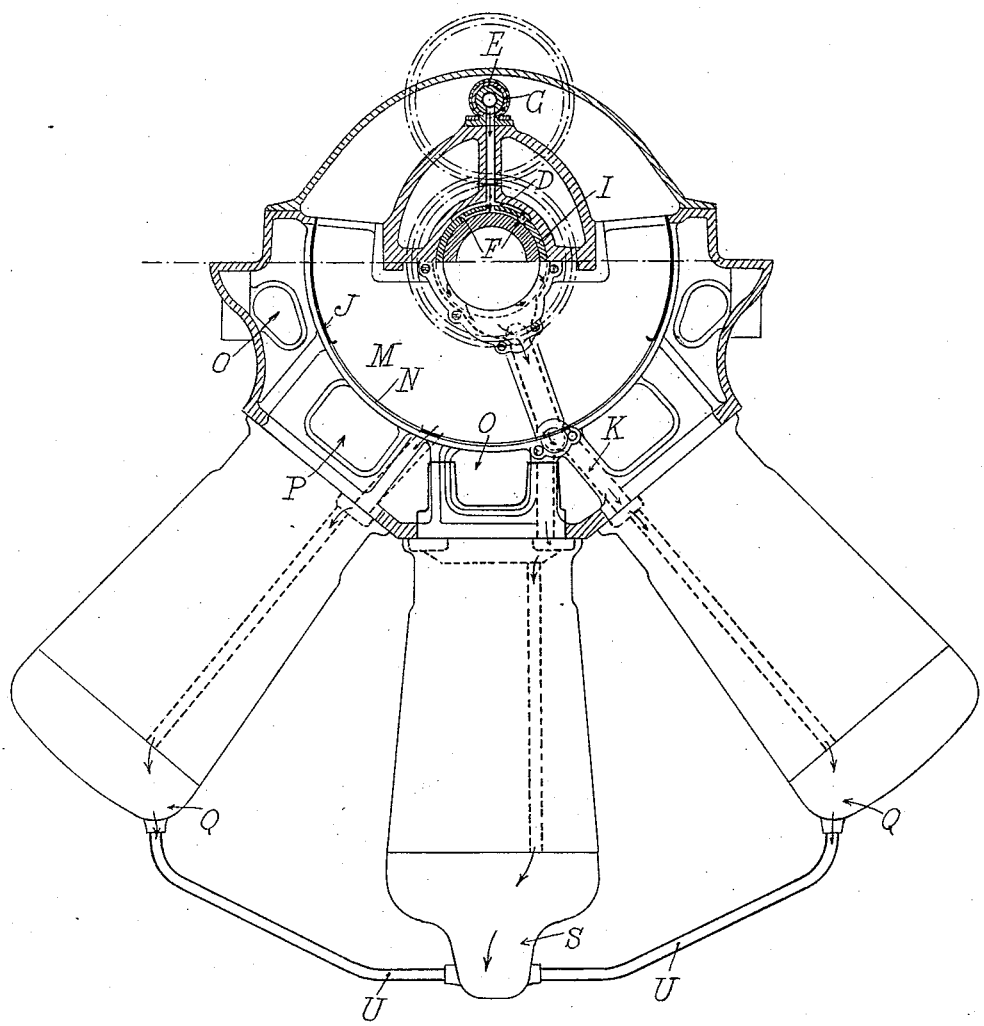

1,892,089

UNITED STATES PATENT OFFICE

CHARLES RAYMOND WASEIGE, OF RUEIL, FRANCE, ASSIGNOR TO HENRI ET MAURICE FARMAN, OF BILLANCOURT, SEINE, FRANCE

LUBRICATING DEVICE FOR INTERNAL COMBUSTION ENGINES

Application filed April 23, 1928, Serial No. 272,339, and in France May 13, 1927.

The present invention relates to a lubricating device for internal combustion engines, which is particularly applicable to high-speed engines, and more particularly to engines whose cylinders have an inverted W disposition.

It is known that the bearings of the connecting rods and the bearings of said engines must be provided with an abundant lubrication, by reason of the great loads and speeds and high friction to which they are subjected. However, it is necessary to prevent the oil from entering the cylinder heads, and chiefly when the engine is in slow-speed operation, at which the temperature of combustion is insufficient to burn the oil introduced in the explosion chamber, this oil causing the sparking plugs to stop its functioning.

It is further necessary, and especially for high-speed engines, to prevent the abundant entrance, into the cylinders, of the cloud of finely-divided oil which is produced by oil projected from the rapidly rotating parts of the engine.

The present invention relates to a device by which this double purpose will be fulfilled. It chiefly comprises a rotary oil feeding device, or distributer, adapted for the intermittent supply of oil under pressure to the bearings of the crankshaft and connecting rods, and also various deflectors which collect all superfluous oil, or oil projected from the parts, and which lead the oil to collecting recipients formed at the lower part of the engine, while preventing all access of such oil to the cylinders.

The principal features of the invention, as well as its advantages, will be specified in the following description with reference to the appended drawings which are given solely by way of example, and in which:

Fig. 1 is a partial lengthwise section, in diagrammatic form, of an engine of the inverted W type, provided with the device according to the invention.

Fig. 2 is a corresponding cross-section.

According to the construction form herein represented, the lubricating oil is supplied under pressure by a suitable pump to a pipe A, and it proceeds hence through a groove and various holes into the interior of a rotary distributer B which permits the introduction under pressure of the oil to the bearings of the crankshaft in an intermittent and well-defined manner. The said distributer has the following construction. A cylindrical tube C is secured to the bearings of the crankshaft by means of apertured straps providing for the circulation of the oil without any external leakage. In the said tube are rotatable the members for the oil supply E, one of which actuates the other, each member being provided with a hole which passes for instance once in each revolution before the orifice for lubricating the bearing. Due to this division of the rotating part into juxtaposed members, I obviate the gripping which would necessarily take place by reason of the great length and the small diameter of the distributer, if this precaution were not taken.

The first member of the distributer is secured to a gear wheel R by which it is rotated. The feeding holes are disposed with reference to one another in such manner that the bearings will be supplied alternately and not simultaneously. With this arrangement a constant pressure is maintained in the lubricating conduits and all stresses upon the oiling control devices are obviated. The oil introduced by the distributer into the conduits of the bearings is led under pressure into a groove D, passing thence through three holes F pierced in the bearing I, fills a small groove which connects the three holes together. The crankshaft bearing is thus properly lubricated, oil being supplied each time that the distributer E opens the orifice leading to the crankshaft bearing. The time during which the oil reaches the bearing will depend upon the diameter of the holes, the length of the groove in the bearing, the speed of the engine, and the speed ratio between the distributer and the crankshaft. This ratio may be made equal to unity, so as to feed the oil once per revolution of the shaft, or several times per revolution if the number of holes in the distributer is greater than one, or the said ratio may be made less than unity, so that the oil will be supplied once in several revolutions of the crankshaft.

The oil which is thus supplied under pressure to the bearing, into the groove connecting the three holes F, is then circulated into the bearing of the connecting rod through a tube T which traverses the arm of the crankshaft, and the oil is supplied by pressure feed during the hole time of coincidence between the said tube and the holes and groove of the bearing.

To provide for a rapid filling of the oil channels, the distributer is properly set with reference to the crankshaft, and in this manner, I am enabled to provide for a certain forward lead for the oil supply.

The bearing surfaces are further oiled in virtue of the inevitable leakage which occurs when the oil passes from the said groove to the oil tube used for the cranks.

In this manner, the bearing surfaces are supplied with oil under pressure in a predetermined and strictly sufficient quantity; due to the provision of the improved distributer, which prevents the bearing from being constantly subjected to the lubricating pressure, which is a usual, but defective practice, since it causes an abundant leakage of oil at the sides of the bearing and a considerable amount of oil is sprayed over all.

After lubricating the bearings, the oil is collected on each side of the latter by the deflecting parts H which are formed on the crankshaft bearing. These deflecting parts serve to break up the oil film and to project the oil into a circular groove G whence it is directly discharged to the exterior of the crankcase through suitable holes and channels K provided in the case and in the bottom parts of the cylinders, and the said channels provide for the gravity return of the oil to the lower parts of the engine, from which it is taken up by the pump and is circulated into the oil tank.

The oil which escapes from the connecting rod bearings is collected upon a tight annular wall J, and is circulated through a conduit K into the aforesaid discharge channels. The said annular wall completely separates the part of the crankcase in which the crankshaft and the connecting rods operate, from the external part into which the bottom parts of the cylinders are caused to open, except to afford passage for the main body of the connecting rods.

The deflecting parts L may be disposed upon the connecting rod heads in order to collect the oil which escapes therefrom, into channels of a double curved shape Z, so that the oil will not be mixed with the air to form a mobile cloud. It is in fact shown by experience that at high speeds the splashing of oil, will form by its impact with the air and by the centrifugal force a cloud of finely-divided oil which is very mobile. The deflectors enter the double curved shaped channel Z, which at once collects the escaping oil; this latter is then circulated through the channels, as stated.

Due to these arrangements, I greatly reduce the splashing of oil in the crankcase, and can prevent all entrance of oil into the cylinders in the form of liquid drops or streams, when operating at slow speed.

However, these means will not be sufficient to prevent the oil cloud which is formed at high speeds from entering the cylinder heads.

In fact, when operating at high speed, the following effects are observed.

1.—The oil thrown off by the parts rotating at high speed is sprayed, and when mixed with the air said oil forms an oil cloud which is very fine and mobile.

2.—The crankshaft and connecting rod heads when rotating at high speed will form a centrifugal device by which this oil cloud is thrown with force against the walls of the cylinders.

3.—The pistons moving at high speed will compress the oil cloud in front of them with great force. These two latter effects are combined, so that the oil cloud will enter the cylinder above the piston during the suction stroke. It thus causes disturbances in the carburation, and occasions carbon deposits upon the cylinder heads and the pistons, as well as the clogging of the sparking plugs and an abundant smoke at the exhaust, also causing a great increase in the consumption of oil.

The device according to the invention will entirely obviate such defects, due to the fact that the cylinder surfaces are supplied with a very small amount of oil, which is just sufficient to assure the lubrication of the pistons.

For this purpose the annular wall J completely separates the chamber M containing the crankshaft and the connecting rods from the remainder of the crankcase. I only employ the apertures N, of minimum size, to give passage to the main body of the connecting rods.

The portion of the webs of the bearings contained in this chamber M is closed in such manner as to partly prevent the centrifugal action upon the oil cloud, by closing off the admission of air at the centre.

To obviate the compression of the oil cloud by the pistons, the notches O are formed in the bottom parts of the cylinders which enter the crankcase, and said notches cooperate with the large apertures P in the webs of the bearings, so as to afford an ample communication between the different chambers of the crankcase situated between the circular wall and the lower ends of the cylinders. In this manner, the upward motion of the pistons in one chamber will be compensated by the downward motion of the pistons in the adjacent chambers, and hence the mobile oil cloud will not be subjected to pressure, but will only be moved at a rapid rate from one chamber to another through the large openings in the webs of the bearings.

My said invention further relates to the device employed for the return of the oil which accumulates in the covers of the lateral cylinders of an engine having cylinders in an inverted W arrangement, and herein I connect the said covers with the central covers S at the front and rear by the pipes U, whereby the oil will flow by gravity into these central covers which thus form recipients. The said pipes U are provided with elastic packing joints to prevent rupture by jarring.

Obviously, the said invention is not limited to the details of construction herein described and represented, these being given solely by way of example, and the several parts of my said device are applicable to all other types of internal combustion engine, and with all necessary modifications, without departing from the scope of the invention.

Having now described my invention, what I claim as new and desire to secure by Letters Patent is:

1. In a multi-cylinder internal combustion engine, a crankshaft, bearings for said crankshaft, supports for said bearings, a lubricant inlet pipe, a rotary transversally yielding distributor connected with said inlet pipe, said distributor comprising a stationary cylindrical member mounted in said supports, a plurality of coaxial hollow members rotatably mounted within said cylindrical member, means for driving one of said hollow members, means for operatively connecting said hollow members and transmitting the rotation to one another each hollow member having at least one port, said ports being adapted to register with corresponding channels extending through said cylindrical member, said crankshaft supports and said bearings, respectively.

2. In an internal combustion engine whose cylinders have an inverted disposition a crankcase, a crankshaft in said crankcase, connecting rods operatively connected with said crankshaft, means for forcing lubricant through said crankshaft between the crankpins and the connecting rod heads a substantially semi-cylindrical partition mounted within said crankcase, coaxially therewith, above the inner ends of the cylinders, said partition having openings adapted to provide for the free movement of the connecting rods, channel members on said partition mounted in planes transverse to the axis of the crankshaft on either side of said openings, respectively, deflecting plates secured on either side of each connecting rod head and adapted to enter said channel members, respectively, and means for discharging oil collected in said channel members.

3. In an internal combustion engine, whose cylinders have an inverted disposition a crankcase, a crankshaft, bearings for said crankshaft mounted in said crankcase, connecting rods operatively connected with said crankshaft, means for lubricating said crankshaft bearings and the heads of said connecting rods, a substantially semi-cylindrical partition mounted within said crankcase, coaxially therewith, above the inner ends of the cylinders, openings in said partition adapted to provide for the free movement of said connecting rods, channel members on said partition mounted in transverse planes on either side of said openings respectively, deflecting plates secured on either side of each connecting rod head and adapted to rotate within said channel members, respectively, means for discharging the excess of oil from said bearings, means for discharging the oil collecting upon said partition and within said channel members, conduits extending along said cylinders and communicating with both said oil discharging means at the top, and chambers at the bottom of said cylinders for collecting oil flowing through said conduits.

4. In a multi-cylinder internal combustion engine according to claim 2 transverse web supports for the crankshaft having fluid-tight connections with said partition, openings in the inner ends of said cylinders and apertures in said supports, below said partition adapted to allow the circulation of the mist of oil between the adjacent cylinders.

5. In an internal combustion engine whose cylinders have an inverted disposition, a substantially cylindrical crankcase, a substantially semi-cylindrical sheet metal partition mounted within said crankcase, coaxially therewith, above the inner ends of the cylinders, said partition having openings adapted to provide for the free movement of the connecting rods of the engine, means for discharging oil collecting upon said partition, conduits extending longitudinally of said cylinders and opening into said oil discharging means at the top, and chambers at the bottom of said cylinders for collecting oil flowing through said conduits.

6. In an internal combustion engine whose cylinders have an inverted disposition, means in the crankcase for collecting the oil and means for discharging said oil from said collecting means, said discharging means including channels extending within the cylinder walls.

7. In an internal combustion engine whose cylinders have an inverted disposition, means for preventing the oil flowing along the walls of the crankcase to enter the cylinders, means for withdrawing said oil from the crankcase, discharging channels extending within the cylinder walls and adapted to receive said withdrawn oil, and chambers provided at the bottom of said cylinders for collecting said oil.

8. In an internal combustion engine whose cylinders have an inverted W disposition, means for preventing the oil flowing along the walls of the crankcase to enter the cylinders, means for withdrawing said oil from the crankcase, discharging channels extending within the cylinder walls and adapted to receive said withdrawn oil chambers provided at the bottom of said cylinders, one for each row of cylinders, for collecting the oil flowing through said channels and, tubes for connecting the above mentioned chambers for the lateral rows of cylinders to the chamber for the middle row of cylinders.

In testimony whereof I have signed my name to this specification.

CHARLES RAYMOND WASEIGE.